United States Patent [19]
Hatano

[11] Patent Number: 5,805,592
[45] Date of Patent: Sep. 8, 1998

[54] ATM NODE AND ROUTING DATA REGISTERING APPARATUS

[75] Inventor: Takashi Hatano, Kawasaki, Japan

[73] Assignee: Fujitsu Limited, Kanagawa, Japan

[21] Appl. No.: 624,941

[22] Filed: Mar. 22, 1996

[30] Foreign Application Priority Data

Aug. 31, 1995 [JP] Japan ..................................... 7-224337

[51] Int. Cl.$^6$ .................................................. H04L 12/56
[52] U.S. Cl. ........................................... 370/395; 370/409
[58] Field of Search .......................... 370/60, 60.1, 94.1,
370/94.2, 58.1, 58.2, 58.3, 94.3, 110.1,
395, 396, 397, 400, 408, 409, 399

[56] References Cited

U.S. PATENT DOCUMENTS 5,515,370  5/1996  Rau ......................................... 370/60.1
5,541,915  7/1996  Storm ...................................... 370/60.1
5,550,821  8/1996  Akiyoshi ................................. 370/60.1

FOREIGN PATENT DOCUMENTS 3198451  8/1991  Japan .

Primary Examiner—Douglas W. Olms
Assistant Examiner—Ajit Patel
Attorney, Agent, or Firm—Helfgott & Karas, P.C.

[57] ABSTRACT

A CPU sets one of first and second memories as an "active system memory" and the other as a "standby system memory". Data about a combination of the VPI/VCI and TAG data is registered in and deleted from only the memory set as the "active system memory". The CPU, only when a null entry exists in a position satisfying a VPI/VCI increasing sequence with an increased address value, registers this null entry in the active system memory with data about new combination of the VPI/VCI and the TAG data. Whereas if there is no such null entry, the CPU reads the data about all the combinations of the VPI/VCI and the TAG data which are registered in the active system memory, re-sorts the read data and the data about the new combinations in the VPI/VCI increasing sequence and write the data from the head address in the standby system memory in a sorting sequence. The CPU, when finishing this writing process, resets the memory so far working as the standby system to an active system memory and the memory so far working as the active system to a standby system memory.

8 Claims, 14 Drawing Sheets

FIG. 4

| ADDRESS | VPI | VCI | TAGA | TAGB |
|---|---|---|---|---|
| 0 | 0 | 1 | 0 | 0 |
| 1 | 1 | 2 | 0 | 1 |
| 2 | 0 | 4 | 4 | 2 |
| ⋮ | | | | |
| 11 | 1 | 1 | 7 | 4 |
| 12 | — | — | — | — |
| 13 | 1 | 3 | 6 | 2 |
| 14 | 1 | 7 | 5 | 1 |
| ⋮ | | | | |
| 4096 | 256 | 65536 | 1 | 3 |

FIG. 11

| TAGB DATA | | | TAGA DATA | | | OUTPUT LINE | | | | | | | | | | | | | | | |
|---|---|---|---|---|---|---|---|---|---|---|---|---|---|---|---|---|---|---|---|---|---|
| a2 | a1 | a0 | com | b1 | b0 | #0 | #1 | #2 | #3 | #4 | #5 | #6 | #7 | #8 | #9 | #10 | #11 | #12 | #13 | #14 | #15 | COM |
| 0 | 0 | 0 | 0 | 0 | 0 | ● | – | – | – | – | – | – | – | – | – | – | – | – | – | – | – | – |
| 0 | 0 | 0 | 0 | 0 | 1 | – | ● | – | – | – | – | – | – | – | – | – | – | – | – | – | – | – |
| 0 | 0 | 0 | 0 | 1 | 0 | – | – | ● | – | – | – | – | – | – | – | – | – | – | – | – | – | – |
| 0 | 0 | 0 | 0 | 1 | 1 | – | – | – | ● | – | – | – | – | – | – | – | – | – | – | – | – | – |
| 0 | 0 | 1 | 0 | 0 | 0 | – | – | – | – | ● | – | – | – | – | – | – | – | – | – | – | – | – |
| 0 | 0 | 1 | 0 | 0 | 1 | – | – | – | – | – | ● | – | – | – | – | – | – | – | – | – | – | – |
| 0 | 0 | 1 | 0 | 1 | 0 | – | – | – | – | – | – | ● | – | – | – | – | – | – | – | – | – | – |
| 0 | 0 | 1 | 0 | 1 | 1 | – | – | – | – | – | – | – | ● | – | – | – | – | – | – | – | – | – |
| 0 | 1 | 0 | 0 | 0 | 0 | – | – | – | – | – | – | – | – | ● | – | – | – | – | – | – | – | – |
| 0 | 1 | 0 | 0 | 0 | 1 | – | – | – | – | – | – | – | – | – | ● | – | – | – | – | – | – | – |
| 0 | 1 | 0 | 0 | 1 | 0 | – | – | – | – | – | – | – | – | – | – | ● | – | – | – | – | – | – |
| 0 | 1 | 0 | 0 | 1 | 1 | – | – | – | – | – | – | – | – | – | – | – | ● | – | – | – | – | – |
| 0 | 1 | 1 | 0 | 0 | 0 | – | – | – | – | – | – | – | – | – | – | – | – | ● | – | – | – | – |
| 0 | 1 | 1 | 0 | 0 | 1 | – | – | – | – | – | – | – | – | – | – | – | – | – | ● | – | – | – |
| 0 | 1 | 1 | 0 | 1 | 0 | – | – | – | – | – | – | – | – | – | – | – | – | – | – | ● | – | – |
| 0 | 1 | 1 | 0 | 1 | 1 | – | – | – | – | – | – | – | – | – | – | – | – | – | – | – | ● | – |
| 0 | 1 | 1 | 1 | 1 | 1 | – | – | – | – | – | – | – | – | – | – | – | – | – | – | – | – | ● |

ATM NODE AND ROUTING DATA REGISTERING APPARATUS

BACKGROUND OF THE INVENTION

1. Field of the Invention

The present invention relates generally to a routing data registering apparatus in an ATM (Asynchronous Transfer Mode) node and an ATM node. The present invention relates more particularly to an ATM node and a routing data registering apparatus for registering an intra node memory which is used for adding the routing data (TAG) indicating an intra node route to a header of the ATM cell with a virtual path identifier (VPI) and a virtual channel identifier (VCI) of an ATM cell and routing data (TAG) corresponding thereto.

2. Description of the Prior Art

In recent years, with a spread of data communications, multimedia communications for transmitting data such as voices, images and codes has been implemented by use of a public network. For this purpose, there starts utilization of a broadband ISDN (Integrated Service Digital Network) capable of attaining data communications at a speed as high as 150–600 Mbps. This broadband ISDN adopts an ATM system as a basic transmission switching system. Based on this ATM system, all items of communication data in different bands are each segmented into a cell having a fixed length (53 octets). Then, a plurality of cells belonging to individual call are transferred while mixed in a transmission path. Further, those cells are switched by hardware.

A header part of the ATM cell is provided with two routing (selection of communication path) fields known as a VPI (Virtual Path Identifier) and a VCI (Virtual Channel Identifier) (see FIG. 9). This VPI is an identifier for identifying a virtual path set between user terminals. The VCI is an identifier for identifying a virtual channel set in the virtual path. Then, a combination of the VPI and the VCI is set as a common value with respect to all the cells belonging to the same call. This VPI is based on an 8-bit structure, while the VCI is based on a 16-bit structure. Hence, a value of the combination of the VPI and the VCI may take any of zero through the value obtained by raising 2 to the (8+16)th power, i.e., the value of $2^{24}$. Among $2^{24}$ VPI-VCI combinations, however, the number of combinations that each of the line terminating circuits incorporated to the ATM node is required to control is limited to "4096". This value "4096" is specified by the UNI (User-Network Interface) specifications authorized by the ATM Forum and derived from the number of connections determined based on a transfer speed of the ATM cell.

By the way, the intra node cell route is determined not by the VPI/VCI itself but by the routing data (TAG data) added to the header of the ATM cell, which corresponds to the VPI/VCI within only the node. That is, A demultiplexer and a switch within the node are automatically switched according to statuses of respective bits constituting this item of TAG data, and the cell is sent to a desired output line. Accordingly, an ATM node controller determines, each time a call setting request is given from a subscriber terminal, a combination of the VPI/VCI given to the cell belonging to this call and the TAG data for sending this cell to a desired output line and registers a memory within an input line terminating circuit with this combination. The input line terminating circuit, every time the ATM cell from the subscriber terminal arrives after setting the call, reads the VPI and the VCI that have been stored in the ATM cell, further reads the TAG data made corresponding to the thus read VPI/VCI from the memory and add the read TAG read to the cell header of the cell. A series of such processes are executed at a high speed, thereby making it possible to add the TAG data in real time with a flow of cells received successively. The combination of the VPI/VCI and the TAG data which has been registered in the memory within the input line terminating circuit is, when the call is disconnected, deleted from this memory.

The following are two kinds of technologies proposed and carried out as those for registering the memory with such routing data and for reading the routing data from the memory.

According to a first prior technology, a memory having $2^{24}$ addresses is employed, and the TAG data corresponding to the VPI/VCI is written to an entry of an address having the same value as the VPI/VCI in that memory. Accordingly, a processor for writing the data to the memory, when requested by the node controller to register a combination of VPI/VCI and the TAG data with respect to a new call, writes this item of TAG data to the entry of the address having the same value as this VPI/VCI but keeps the entry of the address the VPI/VCI of same value as which is not requested to be registered or the VPI/VCI of same value as which is requested to be deleted null. Accordingly, it follows that 16773120 pieces of entries among $2^{24}$ pieces of entries in the memory remain null at all times. On the other hand, the line terminating circuit, when receiving the cell, reads from the memory with the VPI/VCI of this cell serving as a reading address. Then, if the entry corresponding to the VPI/VCI is null, the cell is discarded. The TAG data is, whereas if written to the entry corresponding to the VPI/VCI, added to that cell.

According to a second prior art technology, there are used a first memory having 4096 addresses and a second memory having 4096 addresses, and a TAG data corresponding to a VPI/VCI is written to the entry in the second memory which is indicated by the same address as the address of the VPI/VCI written to the first memory. Accordingly, the processor for performing the write to the memory, when requested by the node controller to register the combination of the VPI/VCI and the TAG data with respect to a new call, writes this VPI/VCI to one of null entries within the first memory and also writes the corresponding TAG data to the entry in the second memory, which is Indicated by the same address as the address of the entry to which the VPI/VCI is written. On the other hand, the line terminating circuit, on receiving the cell, compares the VPI/VCI of this cell with entry values sequentially from the one of the first address in the first memory. Then, if the same value as the VPI/VCI value of the cell is not detected, this cell is discarded. Whereas if the same value as the VPI/VCI value of the cell is detected, the address of the entry of that value is read, and the TAG data is then read from the entry indicated by that address in the second memory. The second technology generally involves the use of a CAM (Contention Association Memory) as a memory from which the address of the entry stored with the same data as the input data is outputted.

The first prior art technology is not, however, realistic for its utilization in terms of causing an increase in cost for the ATM node because of an excessively large capacity of the memory used as compared with the number of the VPI/VCIs to be stored.

Further, the second prior art technology, if the CAM is not employed, requires the comparisons made 4096 times at the maximum. Accordingly, when the ATM cell is being transferred at a high speed, the time needed for the comparison is longer than the time interval at which the ATM cell arrives, and it may happen that the TAG data can not be added in real time with the flow of cells. For adding the TAG data in real time with the flow of cells, the comparison has to be ended faster than the time interval at which the ATM cell arrives at the ATM node, and, therefore, the memory capable of high-speed accessing must be used. This may be a factor for rising the cost for the ATM node. Moreover, in the case of using the CAM in the second prior art technology, though a hardware-basis comparing circuit is not required, the CAM itself is expensive enough to be still a factor for rising the cost for the ATM node.

SUMMARY OF THE INVENTION

It is a primary object of the present invention, which was devised under such circumstances, to provide an ATM node and a routing data registering apparatus that are capable of registering a memory with routing data in a status where the routing data can be read at a high speed.

To accomplish this object, a routing data registering apparatus according to the present invention registers a memory from which routing data corresponding to VPI/VCI written to a header of a cell is read with a combination of new VPI/VCIs and routing data. The routing data registering apparatus comprises a plurality of memories to which combinations of VPI/VCI and routing data are written in a sequence according to values of the VPI/VCIs and a unit for setting one of the plurality of memories as an active system and another as a standby system. This apparatus also comprises a unit for writing, in case a combination of a new VPI/VCI and routing data should be registered, and when there is a null entry to which the combination of the new VPI/VCI and the routing data can be written with said sequence kept in the memory set as the active system, the combination of the new VPI/VCI and the routing data to this null entry. The apparatus further comprises a unit for copying, when there is no null entry to which the combination of the new VPI/VCI and the routing data can be written with the sequence kept in the memory set as the active system, all items of data written to the memory set as the active system and the combination of the new VPI/VCI and the routing data to the standby system memory after re-sorting them in accordance with the VPI/VCI. The apparatus moreover comprises a unit for instructing, in case the copying unit had copied the combinations of the VPI/VCI and the routing data, the setting unit to switch the setting of the active system and the standby system.

An ATM node according to the present invention includes memories from which routing data corresponding to a VPI/VCI written to a cell header of a received ATM cell is read. The ATM node comprises a plurality of memories to which combinations of VPI/VCI and routing data are respectively written in a sequence according to values of the VPI/VCIs and a unit for setting one of the plurality of memories as an active system and another as a standby system. The ATM node also comprises a unit for writing, in case a combination of a new VPI/VCI and routing data should be registered, and when there is a null entry to which the combination of the new VPI/VCI and the routing data can be written with the sequence kept in the memory set as the active system, the combination of the new VPI/VCI and the routing data to this null entry. The ATM node further comprises a unit for copying, when there is no null entry to which the combination of the new VPI/VCI and the routing data can be written with the sequence kept in the memory set as the active system, all items of data written to the memory set as the active system and the combination of the new VPI/VCI and the routing data to the standby system memory after re-sorting them in accordance with the VPI/VCI. The ATM node moreover comprises a unit for instructing, in case the copying unit had copied the combinations of the VPI/VCI and the routing data, the setting unit to switch the setting of the active system and the standby system and a unit for extracting the VPI/VCI contained in the header of the received ATM cell. The ATM node furthermore comprises a unit for reading the routing data corresponding to the VPI/VCI extracted by the extracting unit from the memory set as the active system and a unit for adding the routing data read by the reading unit to the ATM cell.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a diagram showing a structure of a table stored in first and second memories;

FIG. 11 is a table for showing a relationship between TAG data and output routes in a switch unit and DEMUX;

DESCRIPTION OF THE PREFERRED EMBODIMENTS

The present invention will be discussed by way of embodiments with reference to the accompanying drawings.

First Embodiment

<Structure of SDH Frame>

Figure 8:
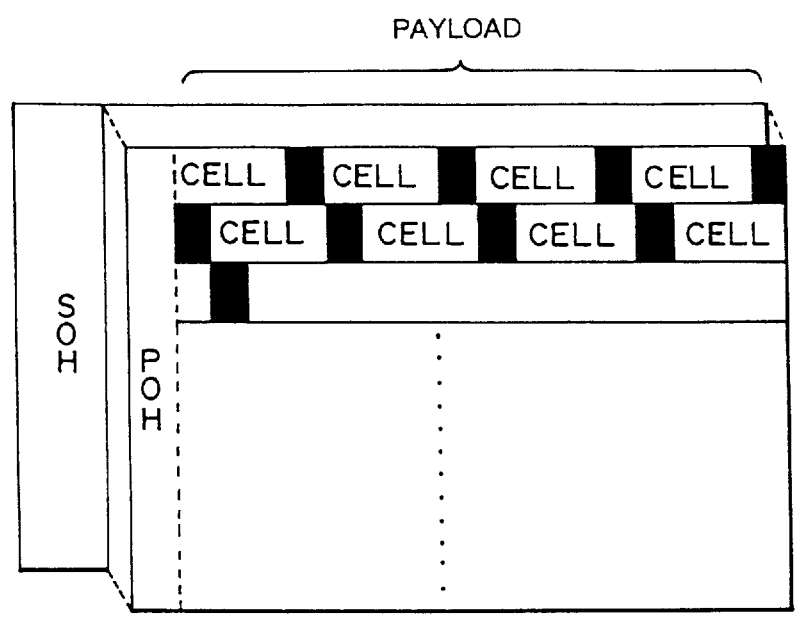
FIG. 8 is a diagram showing a structure of an SDH frame.

To start with, there will be explained a structure of an SDH (Synchronous Digital Hierarchy) frame for transferring cells between a subscriber terminal and an ATM node (UNI) and between the ATM nodes (NNI) in this embodiment. As illustrated in FIG. 8, the SDH frame is composed of a section overhead (SOH) and a path overhead (POH) that are stored with various items of operation data and a payload subsequent thereto and stored with a multiplicity of cells.

<Structure of Cell>

Figure 9:
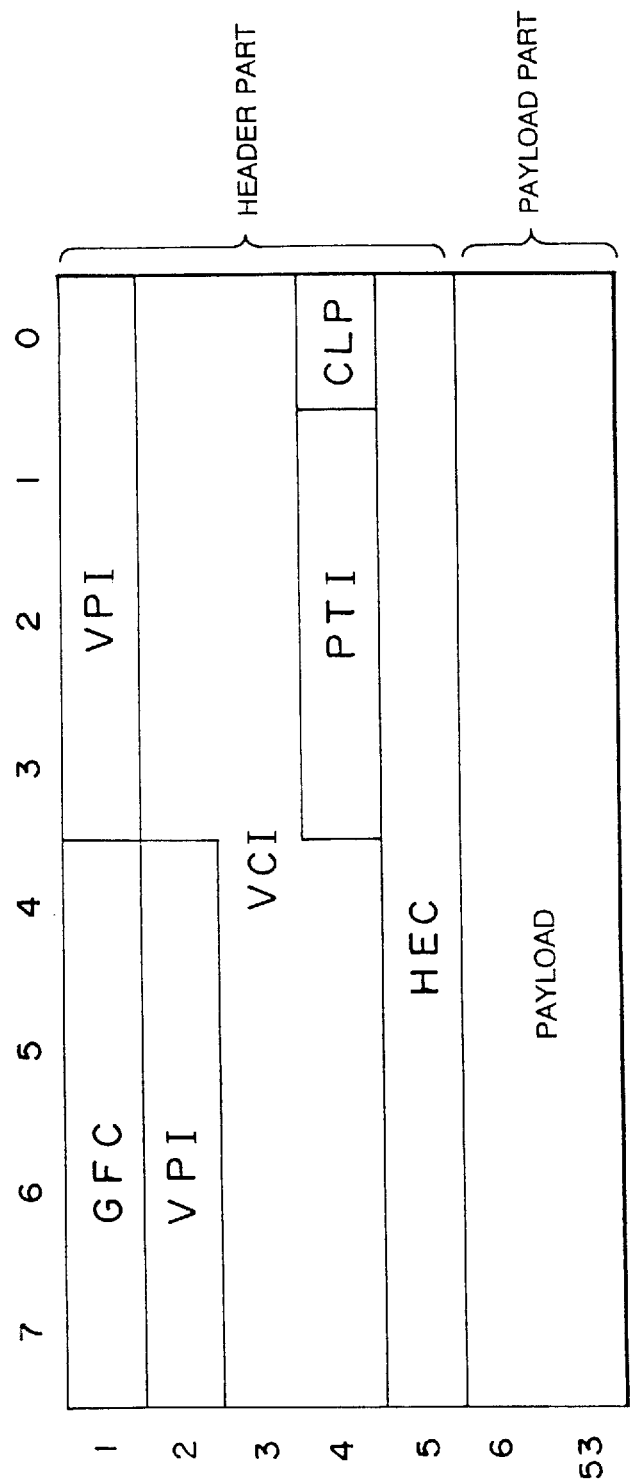
FIG. 9 is a diagram illustrating a structure of an ATM cell flowing through UNI while being stored in the SDH frame.

Next, FIG. 9 illustrates a structure of the cell transferred within th UNI while being stored in the SDH frame. As shown in FIG. 9, the cell is composed of a 5-octet header part and a 48-octet payload part. The header part is a field for indicating which communication the relevant cell belongs to. Further, the payload part is stored with a set of data such as user data, OAM data or resource data.

The first-half 4 bits of the first octet of the header part are occupied by a generic control flow (GFC) area. The last-half 4 bits of the first octet of the header part and the first-half 4 bits of the second octet are the virtual path identifier (VPI). The virtual channel identifier (VCI) extends from the 5th bit in the second octet to the 4th bit in the fourth octet of the header part. A 3-bit area from the 5th bit of the fourth octet is a payload type identifier (PTI). This payload type identifier (PTI) indicates a content classification of the payload field. The content is classified into the user data, the OAM data and the resource data. The last bit of the fourth octet of the header part is a cell loss priority (CLP) indication. This cell loss priority (CLP) indication indicates whether the priority is low ("1") or high ("0"). The 5th octet of the header part is a header error control (HEC) area. Note that when the cell is transferred within the NNI, the generic control flow (GFC) area is deleted, and, instead, 12 bits are given to the virtual path identifier (VPI).

<Structure of ATM Node>

Figure 1:
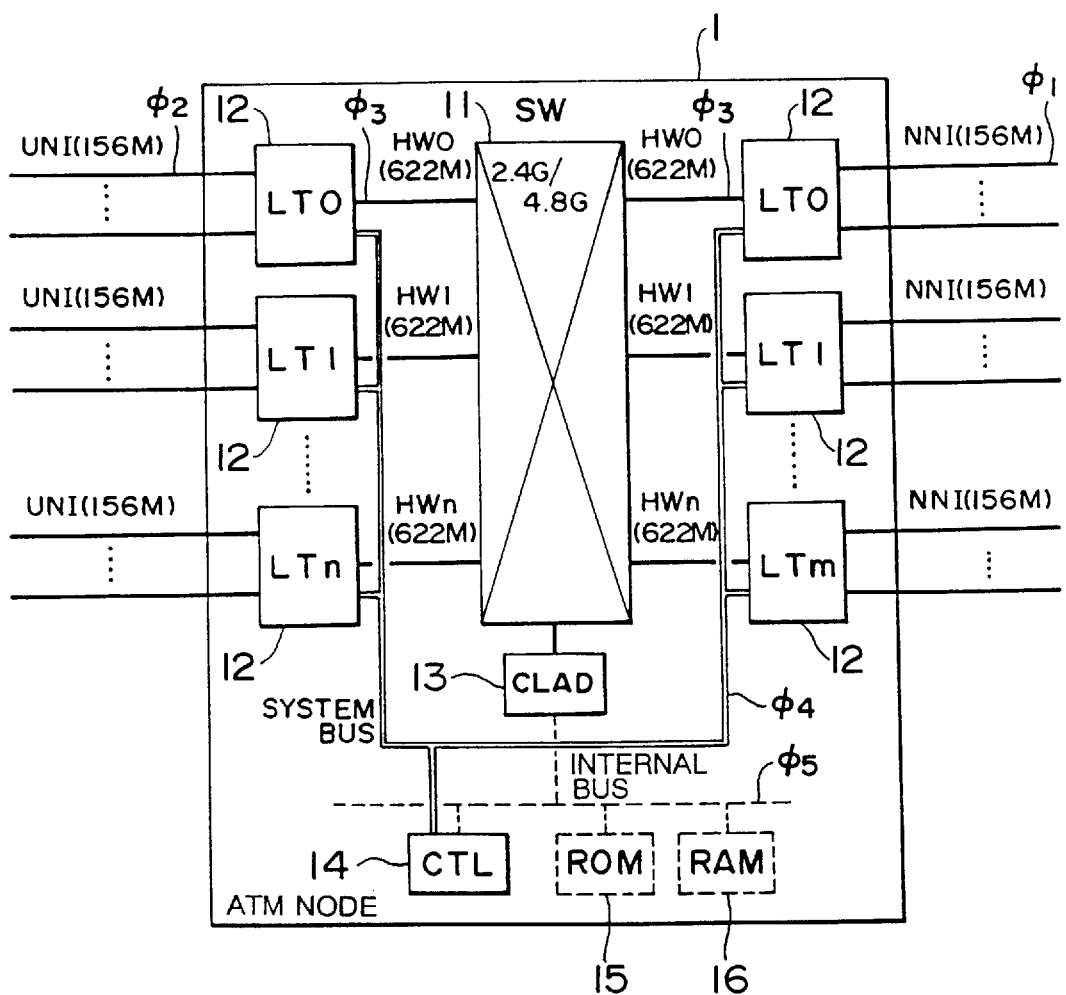
FIG. 1 is a diagram schematically illustrating an ATM node in a first embodiment of the present invention.

Next, an internal structure of the ATM node will be described with reference to FIGS. 1 through 4. As illustrated in FIG. 1, an ATM node 1 is constructed of a plurality of line control units (LT) 12 respectively connected to a plurality of ATM trunk lines φ1 or a plurality of ATM subscriber lines φ2; a single ATM switch (SW) 11 connected via highways (HW) φ3 to all the line control units (LT) 12; a control signal transmitting/receiving unit (CLAD) 13 connected to this ATM cell switch (SW) 11; a main control unit (CTL) 14 connected via a system bus φ4 to all the line control units (LT) 12 and also connected via an internal bus φ5 to the control signal transmitting/receiving unit (CLAD) 13; a ROM (Read-Only Memory) 15 connected via the internal bus φ5 to the main control unit (CTL) 14; and a RAM (Random Access Memory) 16 connected via the internal bus φ5 to the main control unit (CTL) 14.

<ATM Cell Switch (SW)>

The ATM cell switch (SW) 11 is constructed of netted-structure signal paths and switches (MUX, DMUX) for connecting and disconnecting those signal paths. The ATM cell switch 11 incorporates functions to take in cells from its ports individually connected to the respective highways (HW) φ3, select a proper signal path by changing over the internal switch on the basis of routing (TAG) data possessed by that cell and output it to a destination port.

<Control Signal Transmitting Receiving Unit (CLAD)>

The control signal transmitting/receiving unit (CLAD) 13 receives an OAM cell transmitted from an unillustrated console or other node and transmit the OAM cell toward them. The control signal transmitting/receiving unit (CLAD) 13 also receives the cell for call setting request that is transmitted from the subscriber's terminal and notifies the main control unit (CTL) of this cell. The control signal transmitting/receiving unit (CLAD) 13 then transmits a response to that call setting request which is received from the main control unit (CTL) toward the subscriber's terminal.

<Main Control Unit (CTL)>

The main control unit (CTL) 14 has a function to control the respective line control units (LT) 12 and the control signal transmitting/receiving unit (CLAD) 13 by executing a program stored in the RAM 16 and the data stored in the ROM 15. This main control unit (CTL) 14, when receiving the call setting request cell from the control signal transmitting/receiving unit (CLAD) 13, determines the VPI/VCI used for the requested call and the TAG data for specifying a route up to the output lines φ2, φ3 connected to the destination of this call. Then, the main control unit (CTL) 14 transmits data about combinations of the VPI/VCI and the TAG data to the line control unit (LT) 2 which is connected to the lines φ2, φ3 connected to the user terminal which has transmitted the call setting request call and instructs it to register this item of combination data in a memory 122 connected to a proper ATM network terminating circuit 121. Further, the main control unit (CTL) 14, when the call is disconnected, gives an instruction to the time control unit (LT) 2 receiving the cells belonging to that call to delete the VPI/VCI used for that call and the TAG data corresponding thereto.

<Line Control Unit (LT)>

The line control unit (LT) 12 has functions to time-division-multiplex the cells received from the plurality of ATM trunk lines φ1 or ATM subscriber lines φ2 and then runs these cells on the highways (HW) φ3, demultiplex the cells received from the highways (HW) φ3 and transmit the demultiplexed cells to one proper signal line among the plurality of ATM trunk lines φ1 or the ATM subscriber lines φ2. Referring to FIG. 1, the ATM node 1 is equipped with m-sets of line control units (LT) 12 connected to the ATM trunk lines φ1 and n-sets of line control units (LT) 12 connected to the ATM subscriber lines φ2.

Figure 2:
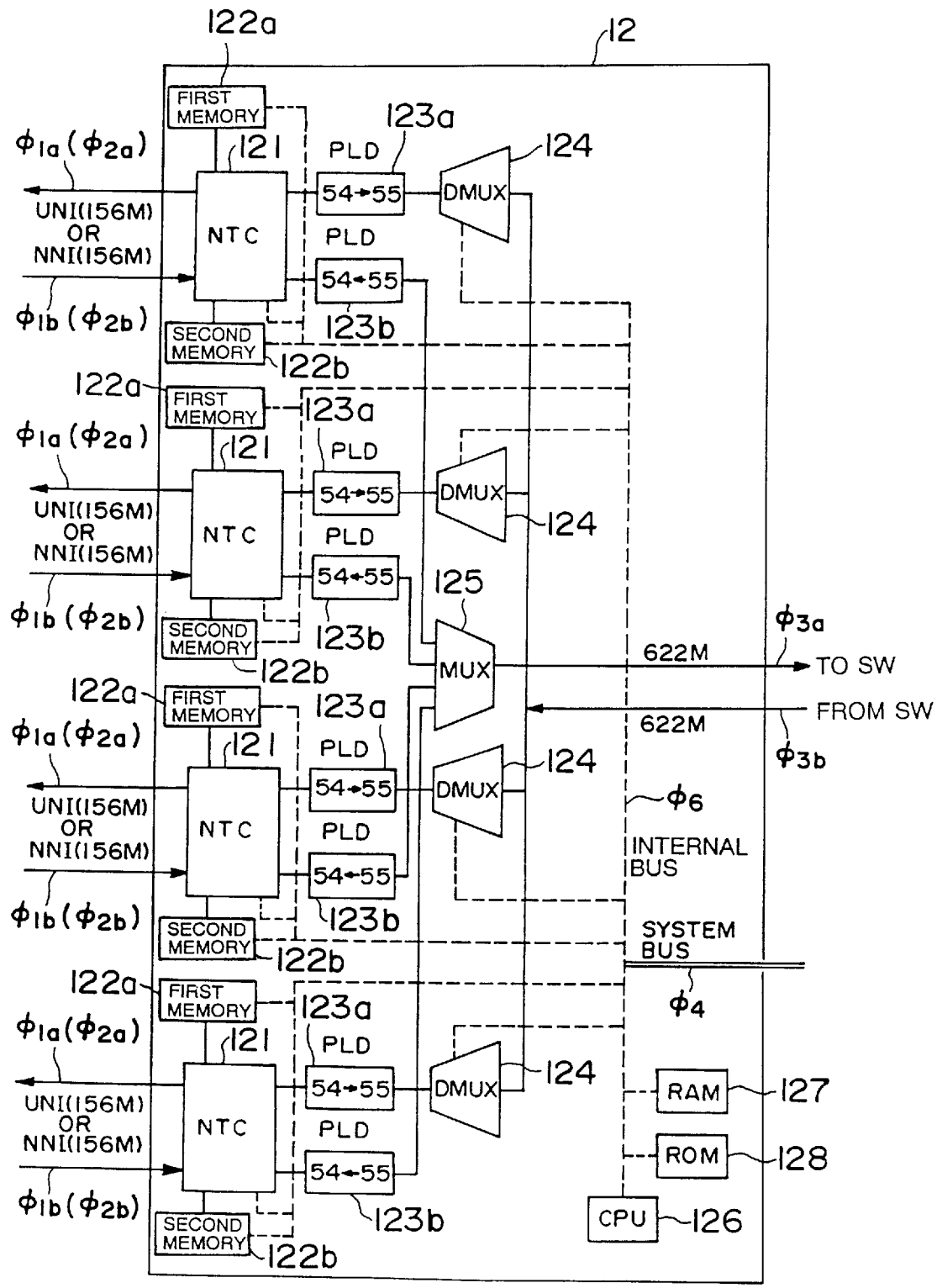
FIG. 2 is a block diagram illustrating a configuration of a line control unit.

The construction of the line control unit (LT) 12 will be explained in greater detail with reference to FIG. 2. As illustrated in FIG. 2, the line control unit (LT) 12 is constructed of four ATM network terminating circuits (NTC) 121 connected to a set of two I/O ATM trunk lines φ1 or a set of two I/O ATM subscriber lines φ2; first and second memories 122a, 122b provided by fours and individually connected to the ATM network terminating circuits (NTC) 121; four sets of HEC added circuits (PLD) 123a each connected to a highway-side input terminal of the ATM network terminating circuit (NTC) 121; four sets of HEC deleting circuits (PLD) 123b each connected to a highway-side output terminal of the ATM network terminating circuit (NTC) 121; four sets of cell demultiplex circuits (DMUX) 124 each connected to an input terminal of each HEC addition circuit (PLD) 123a; a single cell multiplexing circuit (MUX) 125 connected to an output terminals of all the HEC deletion circuits (PLD) 123a; a CPU (Central Processing Unit) 126 connected via an internal bus φ6 to each of the NTCs 121, the first and second memories 122a, 122b, the DMUXes 124 and the MUX 125; a RAM (Random Access Memory) 127 connected via the internal bus φ6 to the CPU 126; and a ROM (Read-Only Memory) 128 also connected via the internal bus φ6 to the CPU 126.

(Memory)

Actualization of each of the memories 122a, 122b involves the use of a semiconductor memory device such as the RAM (Random Access memory), etc. and otherwise actualized by use of a magnetic disk storage device and a magnetic tape device that are readable and writable at a predetermined speed or faster.

FIG. 4 illustrates a structure of each of the memories 122a, 122b. As shown in FIG. 4, each of the memories 122a, 122b has a table structure including addresses 0–4095. Then, values of the VPI, the VCI and the TAG data (TAGA, TAGB) are written to entries of the respective addresses. Note that the values of the VCI, the VPI and the TAG data (TAGA, TAGB) are expressed in the decimal notation in FIG. 4 but may be actually written in binary numbers. A plurality VPI/VCIs are stored in the respective entries within the memory in a state where, if each VPI/VCI treated as on numerical value, those values are sorted in such a sequence that the values increase with larger addresses. Incidentally, the number of values that the VPI/VCI can take, as described above, is larger than the number of entries of the memory 122, and hence the values of VPI/VCI stored in the memory 122 are not serial. Further, if the combinations of the VPI/VCI and the TAG data are deleted, as in the entry of the address 12 in FIG. 4, NULL is set in that entry. NULL-set entry is termed a "null entry", and an address of this null entry is called a "null address".

Herein, the TAG data will be explained. The TAG data consists of an intra SW routing data (TAGA) and an intra line unit routing data (TAGB). This item of intra SW routing data (TAGA) indicates a route within the ATM cell switch (SW) 11, i.e., indicates which line control unit (LT) 12 the cell is sent to. The intra line unit routing data (TAGB) indicates a route within the line control unit (LT) 12, i.e., indicates which cell demultiplex circuit (DMUX) 124 the cell passes through. A relationship between the intra SW routing data (TAGA), the intra line control unit routing data (TAGB) and the routes will be schematically explained with reference to FIGS. 11 and 12.

Figure 12:
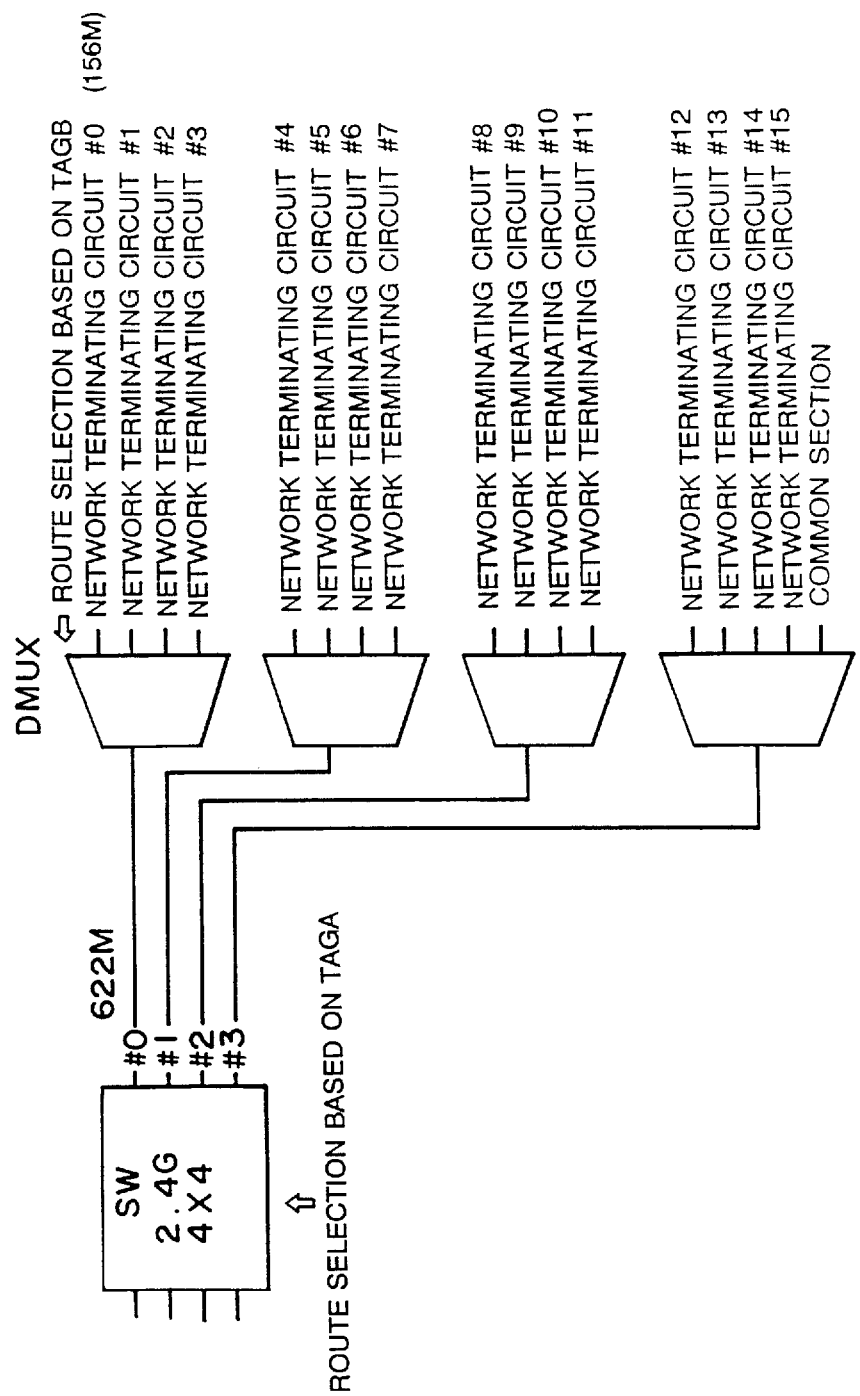
FIG. 12 is an explanatory diagram of TAGA and TAGB.

Now, it is assumed that the ATM cell (SW) 11 has four output ports (#0–#3), and the cell demultiplex circuits (demultiplexers: DMUX1–DMUX4) 124 are connected to the respective output ports. It is also assumed that four lines are connected to each of the cell demultiplexers (DMUX1–DMUX4) 124. In this case, within the ATM cell switch (SW) 11, as shown in the Table of FIG. 11, an output route is determined based on a 3-bit status of TAGA. Further, within the cell demultiplex circuit (DMUX) 124, as shown in the Table of FIG. 12, the output route is determined based on a 2-bit status of TAGB.

(CPU)

The CPU 126 is controlled by the main control unit (CTL) 14 via the system bus φ5. The CPU 126 executes the program stored in the RAM 127 and the data stored in the ROM 128, thereby controlling the individual constructive elements connected via the internal bus φ6. For example, the CPU 126, when instructed by the main control unit (CTL) 14 to register the data about the combinations of the VPI/VCI and the TAG data, specifies the memory 122 connected to the ATM network terminating circuit (NTC) 121 connected to a terminal which will transmit cells including that VPI/VCI and registers the specified memory 122 with the data about the combinations of the VPI/VCI and the TAG data. Further, the CPU 126, when instructed by the main control unit (CTL) 14 to delete the data about the combinations of the VPI/VCI and the TAG data, deletes the data about the combinations of that VPI/VCI and the TAG data from the memory 122 connected to the ATM network terminating circuit (NTC) 121 connected to the terminal which transmitted cells including that VPI/VCI.

The CPU 126, for registering and deleting that item of data, sets one of the first and second memories 122*a*, 122*b* as an "active system memory" and the other one as a "standby system memory". That is, the CPU 126 instructs the ATM network terminal circuit (NTC) 121 to treat one of the memories 122*a*, 122*b* as an active system memory and to treat other one of the memories 122*a*, 122*b* as a standby system memory. Then, the CPU 126, in principle, registers and deletes the data about the combinations of the VPI/VCI and the TAG data with respect to only the memory 122 set as the "active system memory". As stated above, however, there is a restraint in which the VPI/VCIs contained in the data written to the memory 122 have to be sequenced as they increase together with the address values. Hence, only when the null entry exists in a position enough to meet this constraint (the position where the VPI/VCI written in the entry just anterior thereto is a smaller than the VPI/VCI to be registered, but the VPI/VCI written in the entry just posterior thereto is larger than the VPI/VCI to be registered) in the case of registering the data about the combinations of the VPI/VCI and the TAG data, the CPU 126 registers this null entry within the active system memory with the data about the combinations of the VPI/VCI and the TAG data. Whereas if there is no such null entry, the CPU 126 is incapable of registering the active system memory 122 with the data about the combinations of the VPI/VCI and the TAG data. In this case, the CPU 126 reads the data about all the combinations of the VPI/VCI and the TAG data which are registered in the active system memory 122 and adds the data about the combinations of the VPI/VCI and the TAG data which are to be newly registered to the above read data. The CPU 126 re-sorts those pieces of data in the VPI/VCI increasing sequence and writes the pieces of data into the respective entry in the standby system memory 122 from the head address in the re-sorting sequence. The CPU 126, just when this writing process is finished, resets the memory 122 so far working as the standby system to the active system but the memory 122 so far working as the active system memory to the standby system. That is, the CPU 126 instructs the ATM network terminal circuit (NTC) 121 to treat the memory so far working as the standby system as a new active system memory and to treat the memory so far working as the active system as a new standby system memory.

(ATM Network Terminating Circuit (NTC))

Figure 3:
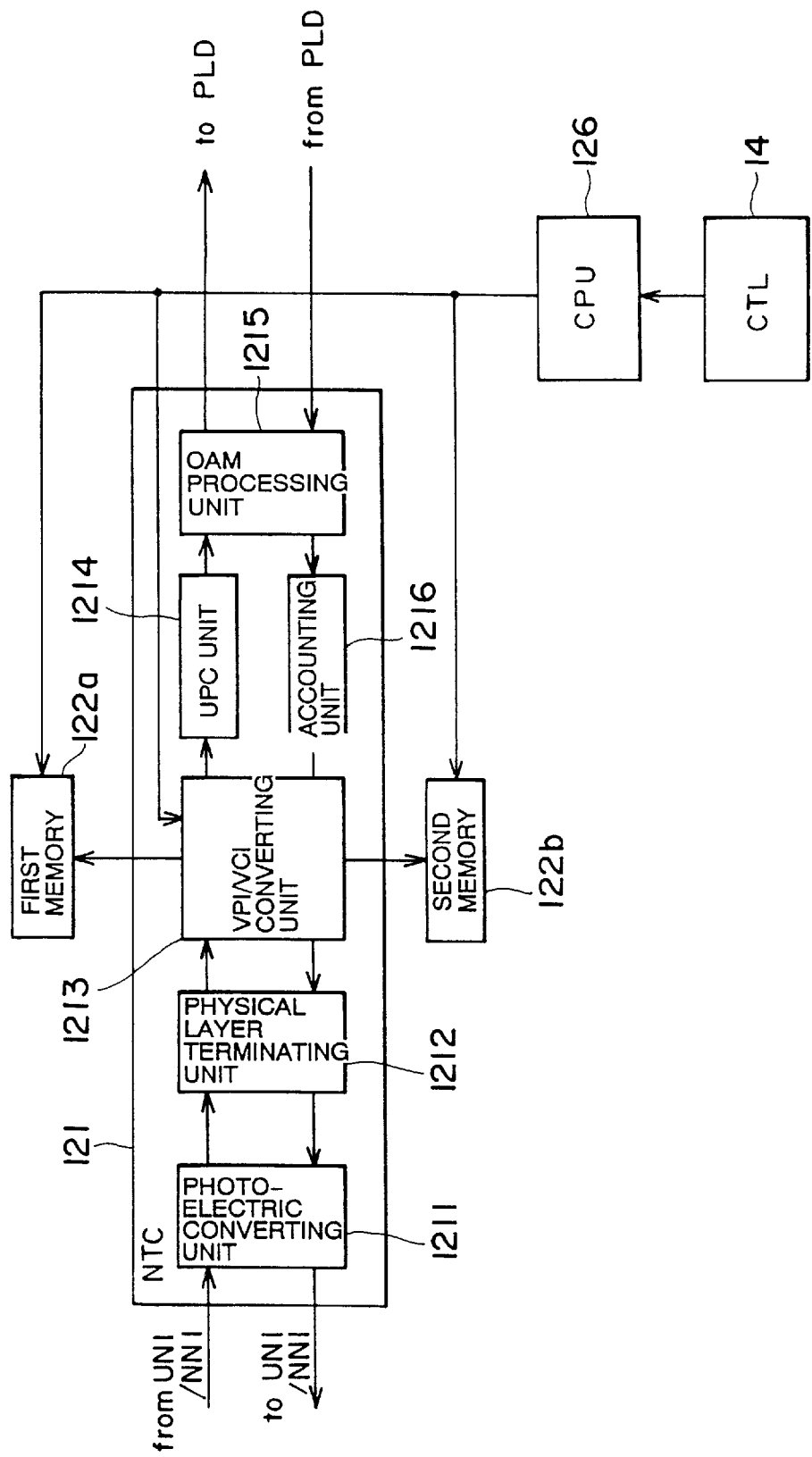
FIG. 3 is a block diagram showing a configuration of an ATM network terminating circuit.

The ATM network terminating circuit (NTC) 121 is a device for terminating the UNI or NNI for distributing the cells in accordance with the SDH and performing a predetermined process on the cell. FIG. 3 illustrates more detailed construction of this ATM network terminating circuit (NTC) 121. As illustrated in FIG. 3, the ATM network terminating circuit (NTC) 121 is constructed of photo-electric converting unit 1211 connected to the UNI or NNI; a physical layer terminating unit 1212 connected to this photo-electric converting unit 1211; a VPI/VCI converting unit 1213 connected to the physical layer terminating unit 1212; a UPC unit 1214 connected to the VPI/VCI converting unit 1213; an OAM processing unit 1215 connected to the UPC unit 1214 and an accounting unit 1216 connected to the OAM processing unit 1215.

The photo-electric converting unit 1211 converts light signals transmitted via an optical cable constituting the UNI or NNI into electric signals and transfers the electric signals to the physical layer terminating unit 1212 or converts the electric signals transmitted from the physical layer terminating unit 1212 into the light signals and sends the light signals to the UNI or the NNI.

The physical layer terminating unit 1212 terminates the SDH frame transmitted from the UNI or the NNI through the photo-electric converting unit 1211. That is, the physical layer terminating unit 1212 decomposes the SDH frame structured as shown in FIG. 8, takes the cells out of the payload and transfers the taken-out cells to the VPI/VCI converting unit 1213. The physical layer terminating unit 1212 also stores the SDH frame with the cells transmitted from the VPI/VCI converting unit 1213 and sends the SDH frame to the UNI or the NNI through the photo-electric converting unit 1211.

Figure 10:
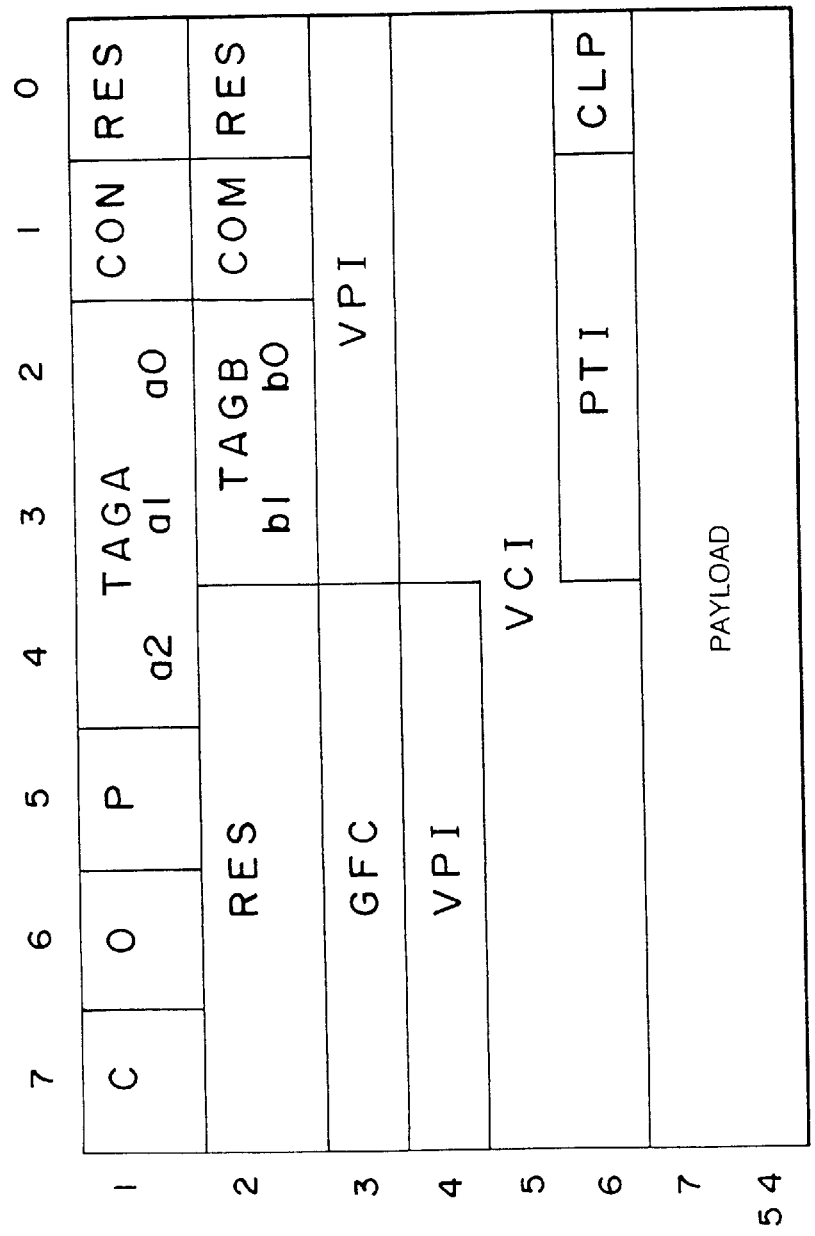
FIG. 10 is a diagram showing a structure of the ATM cell after being header-converted within the line control unit.

The VPI/VCI converting unit 1213 adds or deletes the routing data to or from the header of the received cell and rewrites the VPI/VCI value thereof. Explaining it more specifically, the VPI/VCI converting unit 1213, upon receiving the cell from the physical layer terminating unit 1212, reads the VCI and VPI written to the cell header and searches this VPI/VCI from the memory 122a or 122b designated as the "active system" by the CPU 126. Then, if the VPI/VCI is not written to the active system memory 122, this implies that some error is to be produced, and therefore the received cell is discarded. Whereas if the VPI/VCI is written to the active system memory 122, the VPI/VCI converting unit 1213 reads the TAG data (TAGA and TAGB) written to the same entry as that of this VPI/VCI and adds the TAG data part containing this item of TAG data (TAGA and TAGB) to the head of the cell header. This TAG data part is, as illustrated in FIG. 10, composed to have a 2-octet length and includes, in addition to TAGA and TAGB, a copy indication bit (C), an intra apparatus test cell indicating bit (O), a priority class bit (P), a congestion control bit (CON), a reserve bit (RES) and a common unit selection bit (COM). The copy indication bit (C) indicates whether the cell is used for point-to-point signaling (=0) or for point-to-multipoint signaling (=1). Further, the intra apparatus test cell indicating bit (O) indicates whether the cell is a user cell (=0) or an intra apparatus cell (=1). Also, the priority class bit (P) indicates whether the cell is a high priority cell (=0) or a low priority cell (=1). Further, the congestion control bit (CON) indicates whether the cell belongs to an important call impossible of the cell discard (=0) or an unimportance call possible of the cell discard (=1). The common unit selection bit (COM) is an item of routing data for causing the ATM cell switch 11 to select a route to the control signal transmitting/receiving unit (CLAD) 13. The VPI/VCI converting unit 1213 converts, after adding this TAG data part, the VPI of the cell into a VPI indicating a virtual path of the output line and also the VCI into a VCI showing a virtual channel of the output line. Further, the VPI/VCI converting unit 1213, upon receiving the cell from the accounting unit 1216, deletes the TAG data part added to the received cell.

Figure 13:
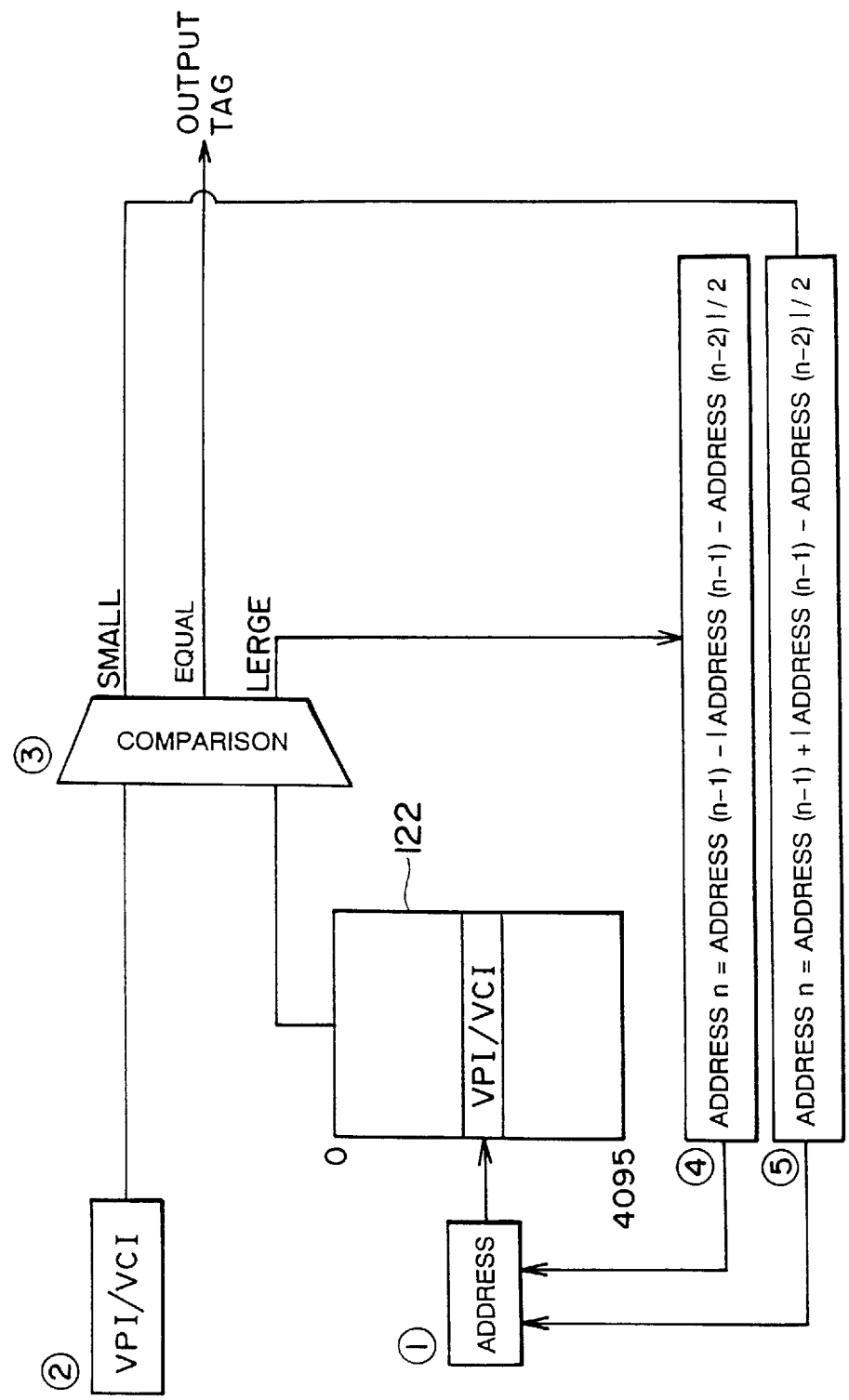
FIG. 13 is an explanatory diagram showing a concept of the binary search.

Note that the VPI/VCI converting unit 1213, when searching the VPI/VCI within the active system memory 122, executes a binary search. That is, the VPI/VCI converting unit 1213, as illustrated in FIG. 13, at first sets a middle address (2048) of all the addresses (0–4095) of the memory 122 as a search address (1). Next, the VPI/VCI converting unit 1213 makes a comparison as to whether or not a value written to the entry indicated by this search address (1) is larger than a search target VPI/VCI (2) ((3)). Then, if equal to each other, the TAG data (TAGA, TAGB) written to that entry are read out. If the value written to the entry indicated by the search address (1) is larger than the search target VPI/VCI (2), a value obtained by halving an absolute value of difference between the present search address (address (n−1)) and a search address (address (n−2) or 0) just anterior thereto is subtracted from the present search address (address (n−1)), whereby a new search address (address n) is set ((4)). Whereas if the value written to the entry indicated by the search address (1) is smaller than the search target VPI/VCI (2), the value obtained by halving the absolute value of difference between the present search address (address (n−1)) and the search address (address (n−2) or 0) just anterior thereto is added to the present search address (address (n−1)), whereby a new search address (address n) is set ((5)). Such a binary search is practicable owing the fact that the VPI/VCIs are stored in the memory 12 with those VPI/VCIs sorted in their increasing sequence. Then, all the addresses of the memory 122 number 4096 ($=2^{12}$), and, therefore, the search can be completed with 12 comparisons at the maximum. Note that the search address (1) is a 12-bit binary number, and hence, in the process (4) of FIG. 13, the least significant bit among the bits set to "1" in the search address (1) is shifted by one bit down to the low-order side, and "0" is set in the previous position of the shifted bit. Further, in the process (5), the least significant bit among the bits set to "1" in the search address (2) is shifted by one bit down to the low-order side, and "1" is set in the previous position of the shifted bit.

Referring back to FIG. 3, the using quantity parameter control (UPC) unit 1214 monitors a traffic density and thus manages a band to be used by the subscriber.

The accounting unit 1216 counts the number of cells transmitted sequentially and notifies the processor of the number of cells.

The operation-and-management (OAM) unit 1215 manages an OEM cell (alarm cell).

(Configuration of HEC Deleting Circuit (PLD))

Referring back to FIG. 2, the HEC deleting circuit (PLD) 123b is a circuit for deleting one octet of the header error control part (HEC) from the cell of totally 55 octets with an addition of the TAG data part by the ATM network terminating circuit (NTC) 121, thus obtaining totally 54 octets (see FIG. 10). The reason for executing this process is that only the cells each having 54 or less octets are allowed to be transferred within the ATM node 1 on one hand, and there is no need for the header error control in the ATM node 1 on the other hand.

(Configuration of HEC Addition Circuit (PLD))

Similarly, the HEC addition circuit (PLD) 123a is a circuit for calculating a proper HEC value, adding it as a 1-octet header error control part to the cell transmitted from the ATM cell switch (SW) 11 in a totally 54-octet status and transferring the totally 55-octet cell to the ATM network terminating circuit (NTC) 121. The reason for executing this process is that there is necessity for the header error control outside the ATM node 1.

(Configuration of Cell Multiplex Circuit (Multiplexer: MUX))

The cell multiplex circuit (MUX) 125 is a circuit for time-division-multiplexing the cells transferred at a speed on the order of 156 Mbps respectively from the four HEC deleting circuits (PLD) 123b and transferring the cells to the ATM cell switch (SW) 11 at a speed of 622 Mbps.

(Configuration of Cell Demultiplex Circuit (Demultiplexer: DMUX))

The cell demultiplex circuit (DMUX) 124 is a circuit for selecting only the cells having the routing (TAG) data destined to the line connected thereto among the cells transferred at the speed of 622 Mbps from the ATM cell switch (SW) 11, permitting a passage thereof and transferring these cells to the HEX addition circuit (PLD) 123a at a speed of 156 Mbps.

<Processes Executed in Node 1>

Explained next are processes executed when a new call set in the node 1.

When the call setting request cell is transmitted from the subscriber's terminal, the ATM network terminating circuit (NTC) 121 adds the TAG data part with the common unit section bit (COM) set to "1" to this call setting request cell and transmits it to the switch unit 11. Then, this cell is transferred from the switch unit 11 to the control signal transmitting/receiving unit (CLAD) 13, and the main control unit (CTL) 14 is notified of this cell. The main control unit (CTL) 14 determines the VPI/VCI used for this call in accordance with the call setting request cell and instructs the control signal transmitting/receiving unit (CLAD) 13 to transmit a response cell for notifying the subscriber's terminal of that VPI/VCI. The main control unit 14 also determines the TAG data (TAGA, TAGB) corresponding to a route for guiding the cells belonging to this call to the output line within the ATM node 1. The main control unit (CTL) 14 instructs the CPU 126 of the line control unit (LT) 12 connected to the line leading from the requesting terminal to register the combination of the thus determined VPI/VCI and TAG data (TAG, TAGB).

Figure 5:
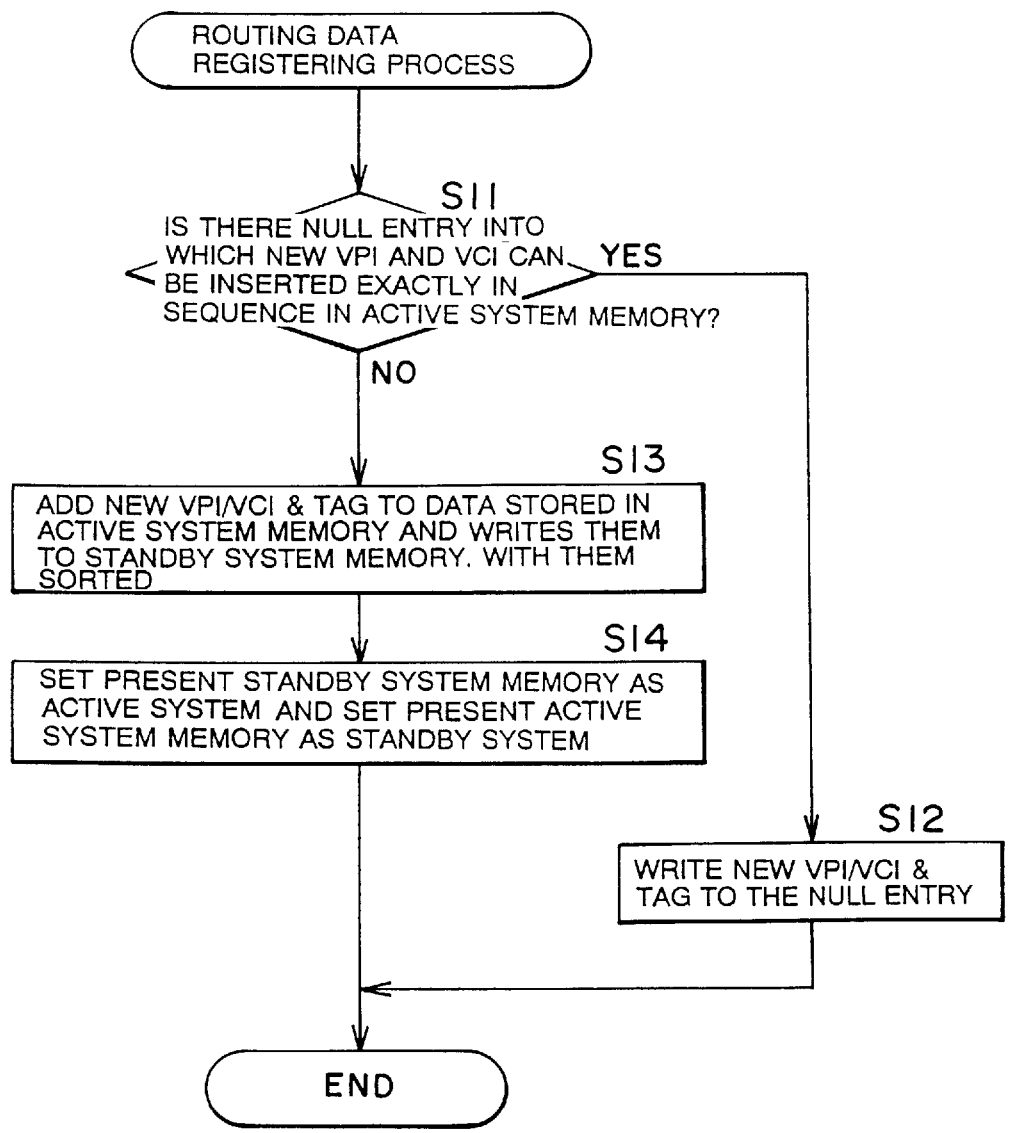
FIG. 5 is a flowchart showing a routing data registering process executed by a CPU in the line control unit.

The CPU 126 receiving this instruction executes a routing data registering process of FIG. 5. Incidentally, in the following discussion, for convenience, the explanation will be given on the assumption that the first memory 122a is set as the "active system memory" at the present.

At first after starting the routing data registering process of FIG. 5, the CPU 126 checks whether or not there is a null entry enough to insert the VPI/VCI of which the main control unit (CTL) 14 has notified exactly in sequence within the active system memory 122a connected to the ATM network terminating circuit (NTC) 121 connected to the line leading from the requesting terminal (step S11). More specifically, the CPU 126 checks whether or not there is a null entry wherein the VPI/VCI written to the entry just anterior thereto is smaller than the notified VPI/VCI but the VPI/VCI written to the entry just posterior thereto is larger than the notified VPI/VCI. For instance, supposing that the active system memory 122 is in a memory status as shown in FIG. 4, the CPU 126, when notified of VPI="0" and VCI="3", decides that there is no null entry but, when notified of VPI="1" and VCI="2", decides that there is a null entry (address 12).

When deciding that there is the null entry, the CPU 126 writes, to this null entry, the VPI/VCI of which the main control unit (CTL) 14 has notified (step S12), then finishing the processing in FIG. 5.

In contrast with this, when deciding that there is no null entry, the CPU 126 reads all pieces of the data about the combinations of the VPI/VCI and the TAG data that are written to the active system memory 122a. Then, the CPU 126 adds the notified data about the combinations of the VPI/VCI and the TAG data to the pieces of combination data that have been read and resorts the thus added pieces of combination data in the VPI/VCI increasing sequence. Subsequently, the CPU 126 writes each piece of combination data in accordance with the resorted-sequence from the entry of the head address in the standby system memory 122b (step S13). When finishing this write-copying process, the CPU 126 resets the memory (second memory 122b) set as the "standby system memory" at the preset to the "active system memory" and also rests the memory (first memory 122a) set as the "active system memory" at the present to the "standby system memory" (step S14), then finishing the processing in FIG. 5.

Thereafter, in accordance with the response cell transmitted from the control signal transmitting/receiving unit (CLAD) 13, the subscriber's terminal stores the SDH frame with the multiplicity of cells affixed with the VPI/VCIs designated in the response cell and successively transmits them to the ATM node 1. The physical layer terminating unit 1212 and the VPI/VCI converting unit 1213 within the ATM network terminating circuit (NTC) 121 executes a cell header editing process shown in FIG. 6 each time these units receive the SDH frames.

In this cell header editing process, at first, the physical layer terminating unit 1212 terminates the SDH frame signal (step S21). That is, the physical layer terminating unit 1212 decomposes the received SDH frame per cell.

Next, the VPI/VCI converting unit 1213 takes out one of the ATM cells contained in the SDH signal terminated in step S21 (step S22). Next, the VPI/VCI converting unit 1213 reads a VPI value and a VCI value from the cell header of the ATM cell taken out in step S22 (step S23). Subsequently, the VPI/VCI converting unit 1213 binary searches the active system memory 122 (which is herein assumed to be the first memory 122a) on the basis of the VPI and the VCI read in step S23 (step S24).

Figure 6:
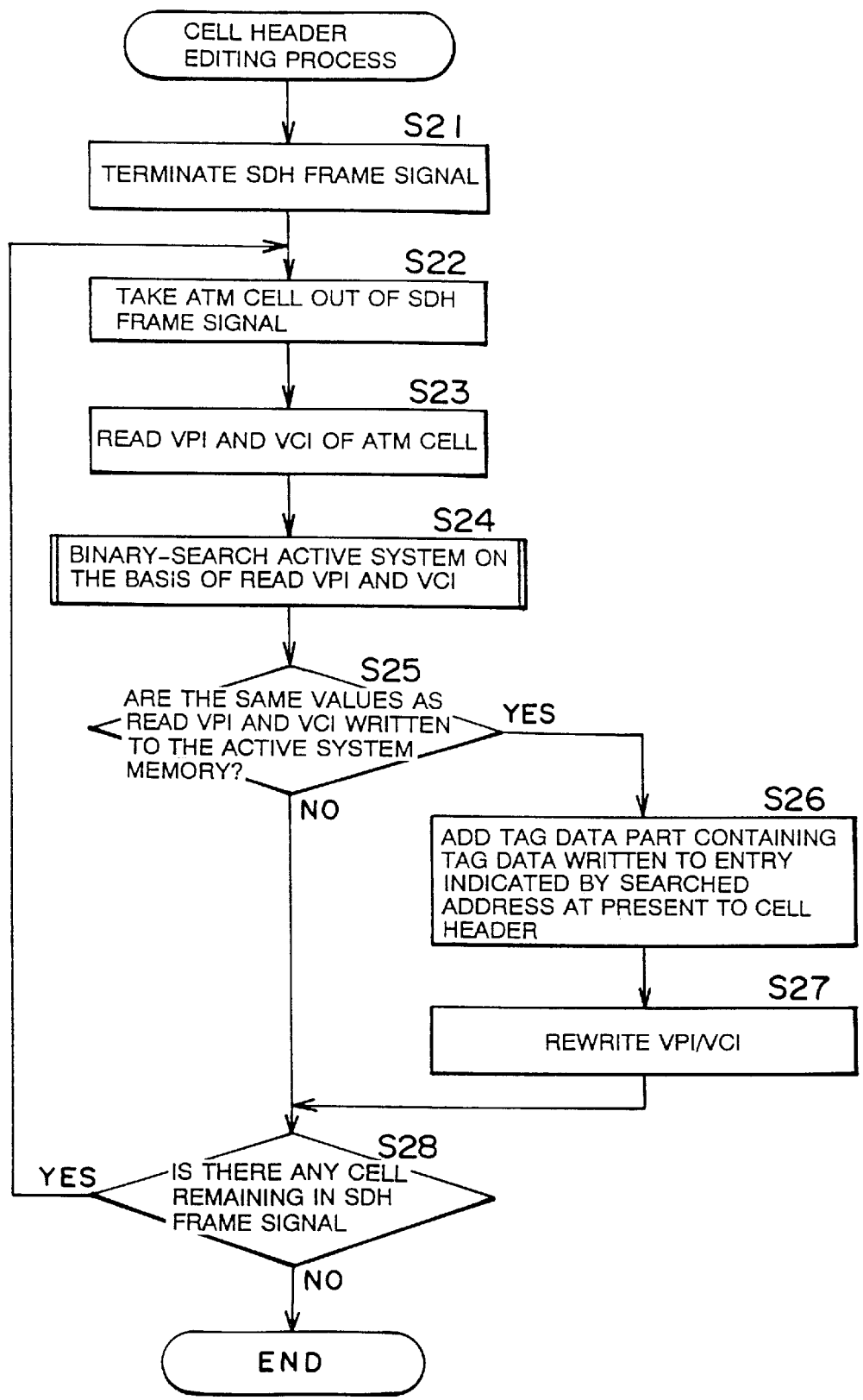
FIG. 6 is a flowchart showing a cell header editing process executed by a VPI/VCI converting unit as well as by a physical layer terminating unit within the ATM network terminating circuit.
Figure 7:
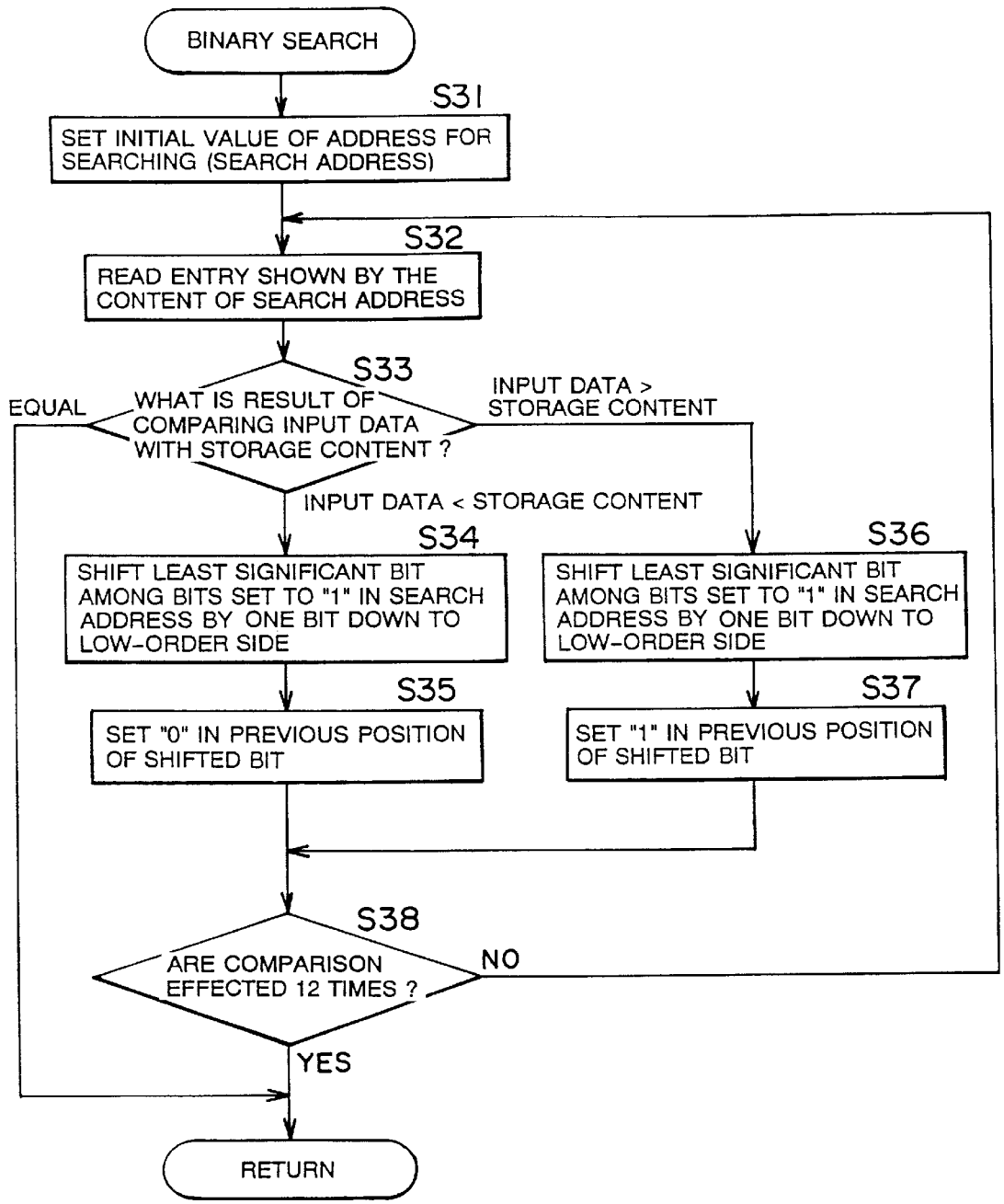
FIG. 7 is a flowchart showing a binary search process executed in step S24 of FIG. 6.

FIG. 7 is a flowchart showing a binary search subroutine executed in step S24. In first step S31 after entering this subroutine, the VPI/VCI converting unit 1213 sets an initial value (i.e., "2048") of a search address (step S31). Next, the VPI/VCI converting unit 1213 reads storage contents of VPI- and VCI-columns shown by the search address in the active memory 122a (step S32). Subsequently, the VPI/VCI converting unit 1213 compares one numerical value as which the whole VPI/VCI read in step S23 is treated with a value of the storage contents read in step S32 (step S33). Then, if the two values are equal, the VPI/VCI converting unit 1213 directly finishes this subroutine and returns the processing to the main routine of FIG. 6. If the value of the VPI/VCI read in step S23 is smaller than the value of the storage contents read in step S32, the VPI/VCI converting unit 1213 shifts the least significant bit among the bits set to "1" in the search address set at the present by one bit down to the low-order side (step S34). Then, the VPI/VCI converting unit 1213 sets "0" in the previous position of the shifted bit (step S35). For example, supposing that the search address set at the present is "2048" ("100000000000" in the binary notation), the VPI/VCI converting unit 1213 resets it to "1024" ("01000000000" in the binary notation). Whereas if the value of the VPI/VCI read in step S23 is larger than the value of the storage contents read in step S32, the VPI/VCI converting unit 1213 shifts the least significant bit among the bits set to "1" in the search address set at the present by one bit down to the low-order side (step S36). Then, the VPI/VCI converting unit 1213 sets "1" in the previous position of the shifted bit (step S37). For example, supposing that the search address set at the present is "2048" ("100000000000" in the binary notation), the VPI/VCI converting unit 1213 resets it to "3072" ("11000000000" in the binary notation). In any case, the VPI/VCI converting unit 1213 checks whether or not the number of comparisons in step S33 after entering this subroutine reaches 12 (S38). Then, when the number of comparisons does not come to 12, the processing goes back to step S32, and the VPI/VCI converting unit 1213 reads the storage contents based on the search address set at the present. When the number of comparisons reaches 12 as a result of repeating the above loop, the VPI/VCI converting unit 1213, after finishing this subroutine, returns the processing to the main routine of FIG. 6.

Checked next in the main routine of FIG. 6 is whether or not the same value as the VPI/VCI read in step S23 is written to the active system memory 122a (step S25). More specifically, when it is decided that the two value are "equal" in step S33 in the subroutine of FIG. 7, the VPI/VCI converting unit 1213 decides that the same value as the VPI/VCI read in step S23 is written to the active system memory 122a. Then, when it is decided that the same value are written, the VPI/VCI converting unit 1213 reads the TAG data (TAGA, TAGB) written to the entry indicated by the search address at the time the processing exits step S24 and adds the TAG data part to which this item of TAG data has been written to the cell header of the ATM cell taken out in step S22 (step S26). Next, the VPI/VCI converting unit 1213 rewrites the VPI/VCI within the cell header of this ATM cell into a VPI/VCI for the output circuit (step S27), and the processing proceeds to step S28. Whereas if it is decided that the same value are not written thereto in step S25, the processing proceeds directly to step S28. In this case, the TAG data part is not added to the ATM cell, and hence it follows that this ATM cell is discarded within the switch unit 11. In step S28, the VPI/VCI converting unit 1213 checks whether or not an ATM cell still remains in the SDH frame. Then, if an ATM cell remains, the processing goes back to step S2. Whereas if an ATM cell does not remain, this header editing process comes to an end. Note that the VPI/VCI converting unit 1213, if the CPU 126 is in the course of executing the write process in step S13 (FIG. 5) at the time the binary search in step S24 is executed, performs the binary search with respect to the active system memory (from which the data is read in step S13) at that time, and, when the resetting of the "active system" and the "standby system" completed, performs the binary search with respect to the active system memory (to which the data is written and copied in step S13) at that time.

<Effects in the First Embodiment>

In this embodiment, the small memory 122 including its addresses as small as 4096 is used, and the combination data of the VPI/VCI and the TAG are mutually copied by switching the two memories 122a, 122b alternately to the active system and the standby system. Then, during the copying, a new item of combination data of the VPI/VCI and the TAG is added, and the re-sorting is carried out. Hence, the data about the combinations of the VPI/VCI and the TAG data which are stored in the active system memory are always in the sorted status in the VPI/VCI increasing sequence according to the rise in the addresses. Accordingly, the VPI/VCI can be binary-searched from the active system memory 122. Therefore, it is possible to check whether or not the VPI/VCI read from the ATM cell is registered in the memory 122 by comparisons of 12 times at the maximum and, if it is registered to know the address of the entry stored with the VPI/VCI. Accordingly, even if a memory with low-speed accessibility is employed as the memory 122 and no special hardware for the comparison is used, the header editing can be done in a time shorter than the time interval at which the ATM cell arrives. As a result, the costs for the ATM nodes can be reduced down.

Second Embodiment

Figure 14:
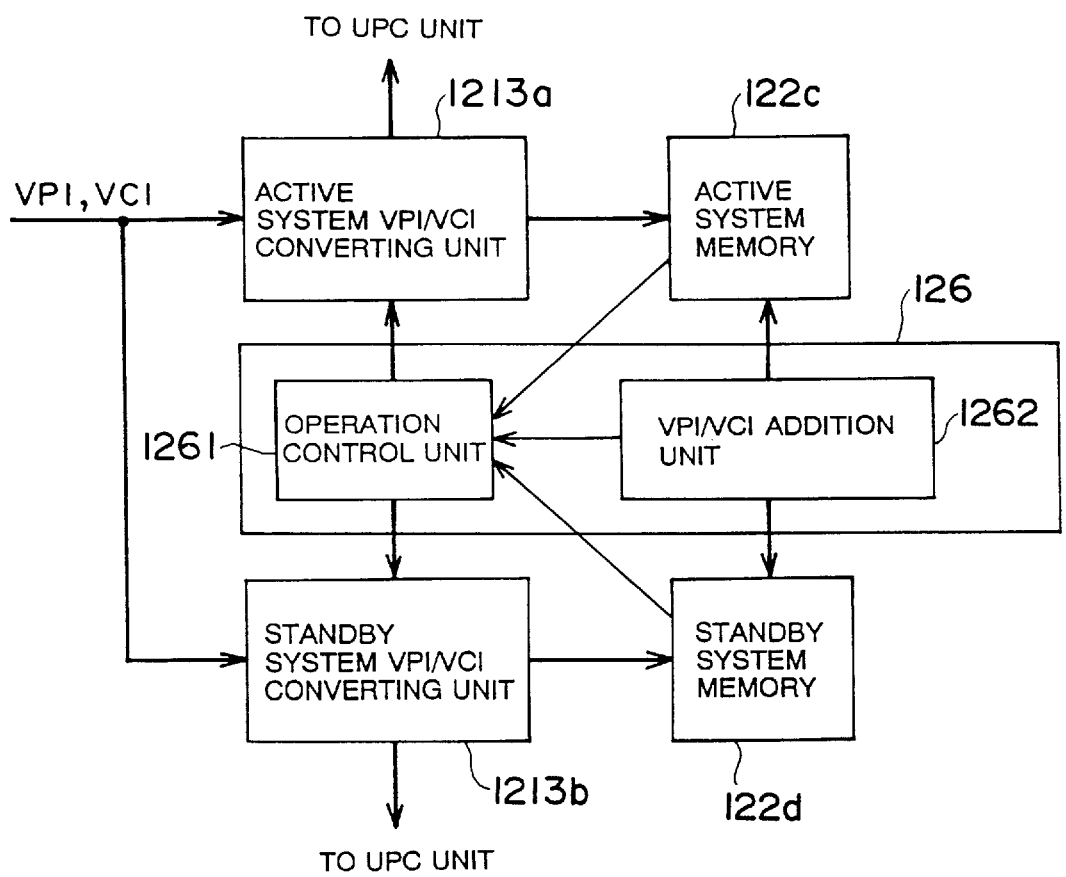
FIG. 14 is a block diagram illustrating the principal portion of the line control unit of an ATM switching equipment in a second embodiment of the present invention.

FIG. 14 is a block diagram illustrating the principal portion within the line control unit 12 in accordance with a second embodiment of the present invention. The second embodiment exhibits such characteristics that there are provided an active system VPI/VCI converting unit 1213a and a standby system VPI/VCI converting unit 1213b, and the CPU 126 is provided with an operation control unit 1261, and a VPI/VCI addition unit 1262.

Active- and standby-system memories 122c, 122d are stored with the data about the combinations of the VPI/VCI and the TAG data in the VPI/VCI increasing sequence according to the rise in the address value.

The VPI/VCI addition unit 1262, when the active system memory 122c has a null entry enough to write the VPI/VCI of which the main control unit (CTL) 14 has notified with the sorted status in the active system memory 122c kept, writes the data about the combinations of the VPI/VCI notified from the main control unit (CTL) 14 and the TAG data in this null entry. While on the other hand, if such a null entry does not exist in this active system memory 122c, the VPI/VCI addition unit 1262 reads the data about all the combinations of the VPI/VCI and the TAG data from the active system memory 122c. Then, the VPI/VCI addition unit 1262 adds the data about the combinations of the VPI/VCI and the TAG data notified from the main control unit (CTL) 14 to the read data re-sorts the added data and write the re-sorted data in the VPI/VCI increasing sequence from the entry of the head address in the standby system memory 122d. Subsequently, when this writing process is completed, the operation control unit 1261 is notified of this completion from the VPI/VCI addition unit 1262.

The operation control unit 1261 receiving the notice of that completion deals with the memory 122c so far working as the active system memory as the standby system memory hereafter and the memory 122d so far working as the standby system memory as the active system memory hereafter. The operation control unit 1261 deals with the VPI/VCI converting unit 1213a so far working as the active system unit as the standby system VPI/VCI converting unit hereafter and the VPI/VCI converting unit 1213b so far working as the standby system unit as the active system VPI/VCI converting unit hereafter.

The active system VPI/VCI converting unit 1213a binary-searches the address of the active system memory 122, of which entry is stored with the same value as the VPI/VCI value stored in the ATM cell contained in the SDH frame signal. Then, the active VPI/VCI converting unit 1213a reads the TAG data (TAGA, TAGB) on the basis of the searched address and adds the TAG data part containing the read TAG data to the cell header of the ATM cell.

Other configurations in the second embodiment are the same as those in the first embodiment, and hence explanations thereof will be omitted.

The ATM node or the routing data registering apparatus according to the present invention is capable of registering the memory with the combinations of the VPI/VCI and the routing data in the status where the VPI/VCI can be binary-searched. Accordingly, the routing data corresponding to the VPI/VCI contained in the ATM cell inputted to the ATM node can be read at the high speed from the memory. Hence, the real-time header editing can be performed with respect to the ATM cell inputted. Further, the expensive memory capable of high-speed accessing is not necessarily used, and, therefore, the costs for the ATM nodes can be reduced down.

This invention being thus described, it will be obvious that the same may be varied in the same way. Such variations are not be regarded as a departure from the spirit and scope of the invention, and all such modifications as would be obvious to one skilled in the art Intended to be included within the scope of the following claims.

We claim:

1. A routing data registering apparatus for registering a memory from which routing data corresponding to a VPI/VCI written to a header of a cell is read with a new combination of a VPI/VCI and routing data, said apparatus comprising:

a plurality of memories to which new combinations of VPI/VCI and routing data are written in a sequence according to values of the VPI/VCIs;

means for setting one of said plurality of memories as an active system memory and another as a standby system memory;

means for writing, in case a new combination of a VPI/VCI and routing data should be registered, and when there is a null entry to which the new combination of the VPI/VCI and the routing data can be written with said sequence kept in said memory set as the active system memory, the new combination of the VPI/VCI and the routing data to this null entry;

means for copying, when there is no null entry to which the new combination of the VPI/VCI and the routing data can be written with said sequence kept in said memory set as the active system memory, all combinations of the VPI/VCI and the routing data written to said memory set as the active system memory and the new combination of the VPI/VCI and the routing data to said standby system memory after re-sorting them in accordance with the VPI/VCIs; and means for instructing, in case said copying means had copied the combinations of the VPI/VCI and the routing data, said setting means to reset the memory which has been set as the active system memory as new standby system memory and to reset the memory which has been set as the standby system memory as new active system memory.

2. A routing data registering apparatus according to claim 1, wherein each of said memories has a plurality of entries to which the new combinations of the VPI/VCI and the routing data are respectively written and each affixed with a unique address.

3. A routing data registering apparatus according to claim 2, wherein the new combinations of the VPI/VCI and the routing data are written to said respective memories in VPI/VCI value increasing sequence in accordance with an increase in the addresses.

4. A routing data registering apparatus according to claim 1, wherein the number of said memories is 2.

5. An ATM node including memories from which routing data corresponding to a VPI/VCI written to a cell header of a received ATM cell is read, said ATM node comprising:

a plurality of memories to which new combinations of VPI/VCI and routing data are respectively written in a sequence according to values of the VPI/VCIs;

means for setting one of said plurality of memories as an active system memory and another as a standby system memory;

means for writing, in case a new combination of a VPI/VCI and routing data should be registered, and when there is a null entry to which the new combination of the VPI/VCI and the routing data can be written with said sequence kept in said memory set as the active system memory, the new combination of the VPI/VCI and the routing data to this null entry;

means for copying, when there is no null entry to which the new combination of the VPI/VCI and the routing data can be written with said sequence kept in said memory set as the active system memory, all combinations of the VPI/VCI and the routing data written to said memory set as the active system memory and the new combination of the VPI/VCI and the routing data to said standby system memory after re-sorting them in accordance with the VPI/VCIs;

means for instructing, in case said copying means had copied the combinations of the VPI/VCI and the routing data, said setting means to reset the memory which has been set as the active system memory as new standby system memory and to reset the memory which has been set as the standby system memory as new active system memory;

means for extracting the VPI/VCI contained in the header of the received ATM cell;

means for reading the routing data corresponding to the VPI/VCI extracted by said extracting means from said memory set as the active system; and means for adding the routing data read by said reading means to the ATM cell.

6. An ATM node according to claim 5, wherein each of said memories has a plurality of entries to which the new combinations of the VPI/VCI and the routing data are respectively written and each affixed with a unique address.

7. An ATM node according to claim 6, wherein the new combinations of the VPI/VCI and the routing data are written to said respective memories in a VPI/VCI value increasing sequence in accordance with an increase in the addresses.

8. An ATM node according to claim 7, wherein said reading means binary-searches said active system memory on the basis of the VPI/VCI contained in the header of the ATM cell, thus searches the entry to which the same VPI/VCI as the VPI/VCI contained in the header of the ATM cell is written and reads the routing data written to the searched entry.

* * * * *